3,579,472
METHOD OF FABRICATING EXPANDABLE
THERMO-PLASTIC RESINOUS MATERIAL
Louis C. Rubens and William B. Walsh, Midland, Mich., assignors to The Dow Chemical Company, Midland, Mich.
No Drawing. Continuation-in-part of application Ser. No. 526,358, Feb. 10, 1966, which is a continuation-in-part of application Ser. No. 439,969, Mar. 15, 1965. This application May 31, 1968, Ser. No. 733,231
Int. Cl. C08f 1/16, 7/06, 47/10
U.S. Cl. 260—2.5  8 Claims

ABSTRACT OF THE DISCLOSURE

Replicating foam plastic bodies are prepared by polymerization at room temperature of chlorostyrene, methyl methacrylate, a cross-linking agent and a blowing agent, without requiring a closed mold or vessel.

---

This application is a continuation-in-part of our copending application Ser. No. 526,358, filed Feb. 10, 1966, now abandoned which in turn was a continuation-in-part of our prior application Ser. No. 439,969, filed Mar. 15, 1965, now abandoned.

This invention relates to the fabricating of expandable thermoplastic resinous material. It more particularly relates to a method of fabricating a shaped article which is expandable and will provide an expanded article having substantially the same shape as the unexpanded article.

It is well known in the art that a variety of thermoplastic polymeric and resinous materials may have incorporated therein a blowing or propelling agent for expanding or blowing the materials to provide a cellular structure. Typically, such materials are prepared in the form of granules which may be expanded or alternately heat plastified masses of the resinous compositions containing a suitable gas generating material and may be molded within a mold into a shaped article or extruded in the form of a log, plank, rod and the like. The application of heat to an unfoamed thermoplastic resinous material containing a blowing agent causes the blowing agent to be released or thermally expanded or both while the thermoplastic material is reaching a foaming temperature at which it is sufficiently softened and yieldable to permit the pressure of the thermally expanding blowing agent to expand it into a desired foam structure.

The heat energy which is required to soften the resinous material and release the blowing agent for the foam forming function is conventionally derived from an externally generated source. Thus, steam, hot air and other heat supplying means are ordinarily employed for the purpose of foaming the thermoplastic material. Such expanded resinous structures and expanded particles require a mold capable of withstanding internal pressure and usually pressure reactors or vessels are required for the incorporation of an expanding agent into expandable particles.

Usually it is necessary to utilize reactors which operate under greater than atmospheric pressure or, in the cases where the blowing agent is incorporated with the polymer after the polymer has formed, pressure equipment such as an extruder generally must be used. Such pressure equipment is expensive, frequently hazardous and oftentimes requires considerable maintenance. The usual methods of fabricating expandable articles do not readily permit the fabrication of a shaped article which may be expanded and retain its form while altering only its dimension. Generally, it is necessary to mold the expanded cellular article or to treat a solid polymeric article under pressure in order to cause the blowing agent to enter therein.

It is an object of this invention to provide an improved method of fabricating a foamed thermoplastic resinous shaped article.

A further object of the invention is to provide a method of fabricating foamed shaped articles which does not require the polymerization of the monomeric material into a resin under superatmospheric pressure.

Another object of the invention is to provide a method for the fabrication of expandable thermoplastic resinous articles utilizing room temperature conditions.

It is an object of this invention to provide new compositions of matter which can be conveniently fabricated into shaped articles which possess the capacity to expand to expanded low density cellular replicas of their initial form when sufficiently heat plastified.

These benefits and other advantages in accordance with the present invention are achieved in a method for the fabrication of a foamable structure by polymerizing a monomer capable of providing an expandable thermoplastic resin in the presence of a blowing agent or expanding agent at a temperature of from about 0° to about 80° centigrade under atmospheric pressure while the monomeric material and the expanding agent are restrained in a mold having the form of the desired end product.

Other objects of the invention and further benefits and advantages will become more apparent from the following description.

The thermoplastic resinous materials which can be prepared in accordance with the present invention are those which are prepared by polymerizing monomers selected from the group consisting of monochlorostyrenes, dichlorostyrenes, methylmethacrylate, and mixtures thereof containing up to about 30 weight percent styrene.

Optionally, for a maximum degree of replication, minor quantities of a difunctional copolymerizable monomer, such as divinylbenzene, may be incorporated in quantities of from about 0.035 percent to about 1 percent by weight and preferably from about 0.04 percent to about 0.25 percent by weight. The percentages being based on the weight of the polymerizable monomers exclusive of the crosslinking agent, such as pentaerythritol tetramethacrylate, ethylene dimethacrylate, neopentyl glycol diacrylate, p-xylene glycol dimethacrylate, hydrogenated bisphenol A dimethacrylate, polypropylene glycol 425 dimethacrylate, diethylene glycol dimethacrylate, polypropylene glycol 150 dimethacrylate, trimethylol propane trimethacrylate, polyethylene glycol 400 dimethacrylate.

The blowing agents employed for the expandable thermoplastice resinous material may be any of those which are commercially utilized for such purposes, including such fugacious materials as trichlorofluoromethane, dichlorotetrafluoroethane, trichlorotrifluoroethane, pentanes, hexanes, and other low boiling hydrocarbons and other suitable materials such as heat-sensitive gas generating agents (liquid or solid) including those which, upon thermal decomposition, generate nitrogen, carbon dioxide, etc. and the like. As is apparent, the expandable resinous materials are prepared with conventional quantities of the particular blowing agent involved, depending upon the amount of the specific propellant substance that may be necessary for a given thermoplastic to accomplish efficient foaming action upon application of heat to the expandable mass. Thus, between about 1 and 15 weight percent or so of such fugacious materials as trichlorofluoromethane, dichlorotetrafluoroethane, trichlorotrifluoroethane or pentane may be employed. The fugacious or gaseous blowing agents may be incorporated into the thermoplastic material by any technique suitable for the purpose; including such procedures placing certain of such agents in the polymerization mass in which the thermoplastic polymer is prepared so as to thereby incorporate efficient amounts of the blowing agent in the polymer and directly provide an expandable product. Similar or even greater amounts (as for example, up to 15–20 or so percent) of such solid blowing agents as $\alpha,\alpha'$-azobisisobutyronitrile or p,p'-oxy-bis benzene sulfonyl hydrazide (which generate nitrogen) and sodium carbonate (which generates carbon dioxide) are generally employed. Advantageously, in certain instances the oxy-bis benzene sulfonyl hydrazide, when used in combination with other blowing agents, particularly those such as the hereinbefore delineated volatile organic liquids, provides a synergistic foaming effect wherein surprisingly large volumes of foam are obtained by the use of trace amounts of the oxy-bis benzene sulfonyl hydrazide. Usually it is desirable to incorporate the oxy-bis benzene sulfonyl hydrazide in the polymerization mixture in a proportion of from about ½ to 1 percent to about 20 percent by weight of the total blowing agent mixture, that is, the sum of the weights of the hydrazide and the volatile organic liquid.

In accordance with the present invention, such blowing agent containing resins are prepared by polymerization of a fluid mixture of the monomeric materials, and blowing agent by a suitable catalyst or catalytic means at temperatures below the boiling point of the polymerizable mixture. Advantageously, a monomer or monomeric material to be polymerized is admixed with the blowing agent and subsequently polymerized. It is often of considerable advantage to dissolve or disperse within the monomer sufficient polymer of either a like or unlike variety to provide a viscous castable and polymerizable mixture. Oftentimes the use of a portion of polymer serves to conveniently alter the viscosity of the material being cast and raise it to a more convenient level such as, for example, in the range of from about 100 centipoises to about $10^6$ centipoises. Further, the incorporation of a polymer reduces the heat of reaction by reducing the total quantity of monomer polymerized per unit volume of product. It minimizes the gasket requirements in a mold, reduces the curing time, as well as reducing the shrinkage. Fillers, dyes, pigments, and the like are readily incorporated in the reaction mixture prior to polymerization provided, of course, they are compatible with the catalyst system and do not inhibit polymerization to an inconvenient degree. The filler materials oftentimes may be such inert materials as woodchips, sawdust, wood flour, staple or other short lengths of various natural and synthetic fibers including for example, glass fibers, cotton, nylon, etc., clay, carbon black, titanium dioxide, calcium carbonate, finely divided silica, and the like may be utilized to secure some degree of coloration in the product. Generally in the preparation of expandable articles and compositions as contemplated in the present invention, the amount of such filler materials which are incorporated within the expandable composition usually will affect the degree of expansion obtainable. For example, the fibrous reinforcing media will significantly reduce the increase in volume which may be obtained for a given composition. Such fillers usually should be maintained at a relatively low level such as under about 5 weight percent if maximum expansion is desired.

The catalysts suitable for the preparation of expandable shaped articles in accordance with the invention are those which given rise to free radicals in the system at a temperature below the boiling point of the polymerizable mixture containing the blowing agent or below the temperature at which a chemical blowing agent decomposes to release a sufficient quantity of gas to cause expansion. Thus, the catalyst must be active at a temperature below the blowing temperature or gas releasing temperature of the polymerizable mixture. Several low temperature decomposing free radical generating polymerization initiation systems are known to those who are skilled in the art, and include such materials as diisopropyl peroxydicarbonate, dimethyl aniline activated benzoyl peroxide, cobalt activated methyl ethyl ketone peroxide, provide excellent low temperature combinations.

Advantageously, high energy ionizing radiation is beneficially utilized to generate free radicals within the polymerizable mixture.

The high energy radiation which is employed in the practice of the present invention is of the type which provides emitted particles or photons having an intrinsic energy of a magnitude which is greater than the planetary electron binding energies that occur in the vinyl monomers to be polymerized. Such high energy radiation is conventionally available from various radioactive substances which provide beta or gamma radiation, as for example, various radioactive forms of elements, including cobalt-60 and cesium-137; nuclear reaction fission products and the like. If it is preferred, high energy radiation from such sources as electron beam generators, including linear accelerators and resonant transformers; X-ray generators and the like may also be utilized.

The high energy ionizing radiation of the type contemplated as being useful in the practice of the present process is capable of penetrating 0.1 millimeter of aluminum or similar density material, as distinguished from ultraviolet light, which is stopped at the surface of such a barrier. Thus, beta and gamma rays are easily capable of penetrating aluminum foil.

In the practice of the present invention generally it is only necessary to admix the desired components and cause them to polymerize at a temperature below the gas or vapor formation temperature of the polymerization mixture. Beneficially, room temperature such as from about 10 to about 35° centigrade will provide adequate polymerization rates for many applications. When high energy ionizing radiation is employed to generate free radicals and initiate polymerization, somewhat lower temperatures may be employed to advantage, particularly in the polymerization of relatively large expandable shaped articles. Molds or the casting of shaped articles in accordance with the present invention may be fabricated from any suitable material of construction including wood, glass, metal, synthetic resinous materials both of the thermosetting and thermoplastic varieties, plaster of paris, foundry sand, and the like. The mold need only have sufficient strength to support the mass of material being polymerized and, a release and/or a sealing coating. For example, oftentimes it is advantageous to employ a coating on the mold of a conformable material which is substantially insoluble in the mixture being polymerized. For example, wax molds are conveniently employed when the surface thereof is covered with a polyvinyl fluoride film, polyvinyl alcohol, polyethylene terephthalate, polytetrafluoroethylene film, and the like. Advantageously, thin coatings of siloxane resins commercially available under the trade name of "Silicones" are also conveniently employed to provide a surface on porous molds which otherwise would be unsuitable. Siloxane mold releases are found to be very satisfactory when conventional metal, glass, and the like molds are employed. The molds require only sufficient strength to maintain their form and have an internal surface which is, for practical purposes, generally impermeable to the polymerizable mixture and blowing agent. In preparing the polymerizable mixture, the order of mixture of the components is not critical. However, it is desirable in most instances to incorporate the blowing agent, be it solid or volatile liquid, in the monomer system, mix well and subsequently add the catalyst if a decomposable catalyst is employed and polymerize to the desired form. In cases where a polymer or filler is utilized usually it is most convenient to dissolve the polymer in the monomer and subsequently add the blowing agent and catalyst combination. However, in instances where the polymer does not dissolve to the desired degree in the polymerizable monomer oftentimes it is advantageous to initially dissolve as much of the polymer as possible in the monomer and subsequently add the blowing agent. Alternately, a polymer-containing monomer solution is readily prepared by partial polymerization of a monomeric mixture rather than subsequent addition of a polymeric material to provide a high viscosity mixture. Generally inert fillers may be added at any stage. However, usually it is desirable that the fillers be wetted by the monomer or monomer blowing agent mixture prior to the addition of a decomposable catalyst, thus preventing preferential absorption of the catalyst on the filler and subsequent reduction of the polymerization rate. However, when heavy section castings are prepared wherein the heat of reaction is difficult to dissipate oftentimes it is advantageous to lengthen the polymerization time by impregnating a filler with the catalyst which will provide a somewhat slower release of the catalyst to the polymerizable material. Advantageously, if castings of a relatively thick section are to be prepared wherein foaming or voids may occur, such castings may be prepared by casting in a plurality of successively thin layers and allowing a major portion of the polymerization to occur in a layer before adding a subsequent layer.

The desirable monomers are:

o-chlorostyrene,
m-chlorostyrene,
p-chlorostyrene,
2,3-, 2,4-, 2,5-, 3,4- 3,5-dichlorostyrene,
2,3-, 2,4-, 2,5-, 3,4-, 3,5-dibromostyrene, and methyl methacrylate.

By utilizing the foregoing monomers and mixtures thereof, rapid polymerization occurs at about room temperature using relatively low quantities of an initiator such as diisopropylperoxydicarbonate.

Advantageously, such monomers may be employed alone or in admixture with each other, or alternately in admixture with various polymers and copolymers which may be dissolved in the monomers. The invention is further illustrated but not limited by the following examples.

EXAMPLE 1

A mixture of the following components was prepared: 89.91 percent orthochlorostyrene, 0.045 percent divinylbenzene, 0.045 percent ethylvinylbenzene, 10.0 percent trichloromonofluoromethane (all percentages by weight). A quantity of this mixture was placed in a rectangular bag prepared by sealing two 1 mil thick polyvinyl fluoride films together at their edges. The bag in the form of a flat packet was placed between two sheets of a magnesium alloy having a thickness of 50 mils. The polyvinyl fluoride bag and contents formed an assembly that was compressed to a thickness of about 1/10 of an inch. The assembled unit was subjected to gamma radiation from a cobalt-60 source at a dose rate of 100,000 roentgens per hour for a period of 24 hours at a temperature of 68° Fahrenheit. The total radiation dose was 2.4 megarads. On removing the magnesium alloy sheets and the polyvinyl fluoride film, a clear bubble-free sheet of hard polymeric material was obtained. The sheet was cut into squares which measured ½ inch on the side and samples were placed in an air oven at a temperature of 128° centigrade and other samples in an air oven having a temperature of 142° centigrade. Foam volume time against time is observed and the results are set forth in the following table:

TABLE I

| No. | Oven temp. (° C.) | Time (minutes) | $\frac{V_{foam}}{V_{solid}}$ | Foam density No. lb./ft.$^3$ |
|---|---|---|---|---|
| 1 | 128 | 4 | 5.8 | 10.8 |
| 2 | 128 | 6 | 8.2 | 7.6 |
| 3 | 128 | 10 | 12 | 5.2 |
| 4 | 128 | 20 | 15.2 | 4.1 |
| 5 | 128 | 60 | 20 | 3.1 |
| 6 | 128 | 120 | 25.3 | 2.5 |
| 7 | 128 | 390 | 42.5 | 1.5 |
| 8 | 128 | 1,200 | 76.8 | 0.81 |
| 1A | 142 | 4 | 5.8 | 10.8 |
| 2A | 142 | 6 | 12.8 | 4.9 |
| 3A | 142 | 10 | 17.3 | 3.6 |
| 4A | 142 | 20 | 22.2 | 2.8 |
| 5A | 142 | 60 | 38.5 | 1.6 |
| 6A | 142 | 120 | 60.4 | 1.03 |
| 7A | 142 | 290 | 87.8 | 0.71 |

Thus, depending upon the foaming time and temperature chosen, a wide variety of foam densities can be obtained. In each case, the expanded piece is an expanded replica of the original. The excellent stability of the foam against shrinkage at the high foaming temperature is evident. The resultant foam had fine uniform cells and the piece expanded into the replica of the original, that is, the foam of the unfoamed samples was unchanged. Only the dimensions were altered.

EXAMPLE 2

In a manner similar to Example 1, the following composition was polymerized and foamed: 89.91 percent orthochlorostyrene, 0.045 percent divinylbenzene, 0.045 percent ethylvinylbenzene, and 10.0 percent isopentane. All percentages are weight percentages. The results are set forth in the following table:

TABLE II.—FOAMING OF COMPOSITION

| No. | Oven temp. (° C.) | Time (minutes) | $\frac{V_{foam}}{V_{solid}}$ | Foam density No. lb./ft.$^3$ |
|---|---|---|---|---|
| 1 | 128 | 4 | 16.2 | 3.86 |
| 2 | 128 | 6 | 19 | 3.29 |
| 3 | 128 | 10 | 23.3 | 2.68 |
| 4 | 128 | 20 | 29.1 | 2.14 |
| 5 | 128 | 60 | 36.4 | 1.71 |
| 6 | 128 | 120 | 52 | 1.2 |
| 7 | 128 | 1,440 | 130 | 0.48 |
| 8 | 128 | 2,520 | 181 | 0.34 |
| 1A | 142 | 4 | 16.5 | 3.78 |
| 2A | 142 | 6 | 23.3 | 2.69 |
| 3A | 142 | 10 | 28.1 | 2.22 |
| 4A | 142 | 20 | 41.4 | 1.51 |
| 5A | 142 | 60 | 65.1 | 0.959 |
| 6A | 142 | 1,320 | 260 | 0.240 |

The foaming rate of the above composition was more rapid than that of Example 1. The resultant foamed particles had fine, uniform cells and the expanded bodies were enlarged replicas of the unfoamed samples. Similar results were obtained when the foregoing procedure was repeated utilizing neohexane, neopentane, and tetrafluorodichloroethane as blowing agents.

EXAMPLE 3

A casting resin syrup was prepared by dissolving 30 grams of polyorthochlorostyrene in 70 grams of orthochlorostyrene. The resulting solution had a viscosity of 6,300 centipoises at 25° centigrade. To this casting syrup was added blowing agents and cross-linking agents as set forth in the following table. The fluid mixtures were placed into polytetrafluoroethylene molds which had cavity dimension of 0.5 inch in diameter and 0.375 inch in height. The open top of the mold was covered with a 1 mil thick polyvinyl fluoride film and the mixtures were polymerized for 24 hours at 25° centigrade. At the end of this period hard resin cylinders were removed from the molds and heated for 15 minutes in an air oven at 140° centigrade. The results are set forth in the following table.

TABLE III.—PREPARATION AND FOAMING OF CAST POLYCHLOROSTYRENE RESINS

| No. | o-Chloro-styrene, wt. percent | DVB-EVB mixture,[1] wt. percent | CFCl₃, wt. percent | Celogen,[2] wt. percent | IPPC,[3] wt. percent | Foaming behavior of cured sample in 15 minutes at 140° C. | |
|---|---|---|---|---|---|---|---|
| | | | | | | Foam vol./ init. vol. | Avg. cell size (mm.) |
| 1 | 90.9 | 0.1 | 8 | 0 | 1 | 13.8 | 1.5 |
| 2 | 90.85 | 0.1 | 8 | 0.05 | 1 | 25.9 | 0.3 |
| 3 | 90.8 | 0.1 | 8 | 0.1 | 1 | 30.4 | 0.25 |
| 4 | 90.6 | 0.1 | 8 | 0.3 | 1 | 20.1 | 0.2 |
| 5 | 90.4 | 0.1 | 8 | 0.5 | 1 | 19.25 | 0.2 |
| 6 | 89.9 | 0.1 | 8 | 1.0 | 1 | 16.78 | 0.2 |
| 7 | 87.9 | 0.1 | 10 | 1.0 | 1 | 23.88 | 0.2 |
| 8 | 85.9 | 0.1 | 12 | 1.0 | 1 | 28.1 | 0.2 |
| 9 | 83.9 | 0.1 | 14 | 1.0 | 1 | 30.4 | 0.2 |
| 10 | 81.9 | 0.1 | 16 | 1.0 | 1 | 36.0 | 0.2 |

[1] 50 weight percent divinylbenzene, 50 weight percent ethylvinylbenzene.
[2] Oxy-bis(benzene sulfonyl hydrazide).
[3] Diisopropyl peroxydicarbonate.

Inclusion of a low concentration of the $N_2$ releasing compound actually results in both a smaller cell size and greater expansion. 0.1 percent of the $N_2$ releasing compound can only generate a maximum of about 0.21 cubic centimeters of gas per gram of polymer. In each case, the foamed article was an expanded replica of the original cylinder.

EXAMPLE 4

A composition was prepared by dissolving 30 parts of polyorthochlorostyrene in 70 parts of orthochlorostyrene. The resultant solution had a viscosity of 6,300 centipoise at 25° centigrade. 90.8 parts of this mixture were combined with 1/10 of a part of a 1:1 by weight mixture of divinylbenzene and ethylvinylbenzene, 8 parts by weight of trichlorofluoromethane, 1/10 of a part by weight of oxy-bis(benzene sulfonyl hydrazide) and 1 part by weight of diisopropyl peroxydicarbonate. A portion of this composition was poured into a 6 inch square stainless steel tray and covered with a polyvinyl fluoride film. After this solution had stood for 16 hours at 25° centigrade, it had polymerized into a clear, hard, bubble-free casting. On heating to a temperature of 140° centigrade, the material expended isometrically 24 volumes to a low density fine celled foam. After a period of 2 hours in an air oven at 140° centigrade, no loss of the trichlorofluoromethane was noted. The thermal conductivity of the foam was 0.135 British Thermal Units per square foot per hour.

EXAMPLE 5

The polymerization procedure of Example 4 was repeated to provide the clear bubble-free casting. A second quarter inch thick layer of the polymerizable mixture was poured onto the casting and polymerized at 25° centigrade for 16 hours. A 6 inch by 6 inch by ½ inch thick expandable sheet was formed. This casting was heated to a temperature of 140° in an air oven for a sufficient length of time to cause uniform foaming. It was not possible to determine from the foamed casting any indication that the product was made from two separate polymerizations. When the procedure of Example 4 was repeated with the exception that the polymerization mixture was a half-inch deep in the tray, some partial foaming and warping of the trays was observed.

EXAMPLE 6

A 3 inch high figurine was utilized as a pattern to prepare a mold. The figurine was made from polyethylene and a room temperature vulcanizing silicone rubber was cast around the figure and permitted to cure. After curing, the silicone rubber was slit and the polyethylene figurine removed therefrom. A mixture comprising 85.3 percent of a mixture of 70 percent orthochlorostyrene monomer and 30 percent orthochlorostyrene polymer, 0.1 percent of a 1:1 by weight mixture of divinylbenzene and ethylvinylbenzene, 0.5 percent diisopropyl peroxydicarbonate, 14 percent trichlorofluoromethane, 0.1 percent oxy-bis (benzene sulfonyl hydrazide) (all percentages by weight) was added to the cavity of the rubber mold. The mixture was polymerized for 24 hours at about 25° centigrade. The mold was removed and a hard transparent replica of the figurine was obtained. The polymerized replica of the figurine was placed in an air oven at a temperature of 145° centigrade for a period of 15 minutes. A volume of expansion of 17 times was observed and the expanded figurine exhibited the detail of the original polyethylene figurine. The cell size was fine and uniform and the surface was smooth.

EXAMPLE 7

A mixture of 88.9 percent of a 70:30 orthochlorostyrene and monomer-polymer mixture, 0.1 percent of a 1:1 divinylbenzene-ethylvinylbenzene mixture, 1 percent isopropylpercarbonate and 10 percent oxy-bis(benzene sulfonyl hydrazide) (all percentages are by weight) was cast into a cylindrical mold having a height of ⅜ of an inch. This mixture was polymerized for 12 hours at about 25° centigrade. At the end of this period, a solid cylinder was obtained which was heated in an air oven to a temperature of 150° centigrade for a period of 15 minutes. A foamed replica of the original casting was obtained which had a volume of 15 times that of the original casting. The cells were too small to be observed with the naked eye.

EXAMPLE 8

A fluid casting composition was prepared having the following composition: 98.8 percent of a mixture consisting of 70 percent by weight of orthochlorostyrene monomer, 10 percent of a butadiene-acrylonitrile copolymer rubber, 10 percent acrylonitrile, and 10 percent trichlorofluoromethane, and 0.1 percent oxy-bis(benzene sulfonyl hydrazide), 0.1 percent of a 1:1 divinylbenzene-ethyl vinylbenzene mixture and 1 percent of diisopropyl peroxydicarbonate. All percentages are percentages by weight. Portions of this mixture were cast and polymerized at 25° centigrade in the form of discs having a diameter of 1.25 inches and a thickness of .375 inch. The cured composition was hard and opaque. The castings were placed in an air oven at a temperature of 145° centigrade for a period of about 10 minutes. The castings increased in volume 8 times, and on cooling to room temperature, were a tough foam with cells of about 0.25 millimeter in diameter. The foam was hammered and crushed flat at room temperature and then placed in an air oven at 145° centigrade where within one or two minutes the original foam shape was regained.

In a manner similar to the foregoing examples, foamed and foamable castings are prepared when the following monomers are substituted for all or part of the monomers employed in the preceding examples:

p-chlorostyrene
m-chlorostyrene
2,3-, 2,4-, 2,5-, 3,4-, 3,5-dichlorostyrene
2,3-, 2,4-, 2,5-, 3,4-, 3,5-dibromostyrene

EXAMPLE 9

A plurality of expandable resinous compositions were prepared substantially in the manner of Example 8 with the exception that the quantity of cross linking agent was varied incrementally from 0 to 1.5 weight percent. The results are set forth in the following table.

TABLE IV.—EFFECTS OF DIVINYL BENZENE CONCENTRATION UPON THE FOAMING BEHAVIOR OF CAST POLY ORTHO-CHLOROSTYRENE

| No. | Resin,[1] (percent) | DVB,[2] percent | Blowing agent[3] CFCl$_3$, percent | Nuc. agt: Cel OT,[6] percent | Equil. swell. vol. in OCEB[3] | Foaming behavior at 150° C.[4] | | | Comp. str. (p.s.i.) | | Comments |
|---|---|---|---|---|---|---|---|---|---|---|---|
| | | | | | | $V_F/V_S$[5] | lb./ft.$^{-3}$ | Cell size (mm.) | 5% defl. | Yield | |
| 1 | 89.9 | 0 | 10 | 0.1 | Soluble | 34.0 | 2.3 | 0.3 | 24 | 28 | Good foam, loss of edge detail. |
| 2 | 89.87 | 0.015 | 10 | 0.1 | Soluble | 37.0 | 2.1 | 0.3 | 31 | 34 | Better edge detail than for 1. |
| 3 | 89.83 | 0.035 | 10 | 0.1 | | 33.0 | 2.4 | 0.2 | 37 | | Better edge detail than for 2. |
| 4 | 89.8 | 0.05 | 10 | 0.1 | | 31.0 | 2.5 | 0.2 | 34 | 38 | Excellent replica. |
| 5 | 89.75 | 0.075 | 10 | 0.1 | | 26.0 | 3.0 | 0.2 | 51 | | Do. |
| 6 | 89.7 | 0.1 | 10 | 0.1 | | 24.0 | 3.3 | 0.2 | 62 | | Do. |
| 7 | 89.6 | 0.15 | 10 | 0.1 | 14.99 | 20.0 | 3.9 | 0.2 | | 103 | Do. |
| 8 | 89.4 | 0.25 | 10 | 0.1 | 9.58 | 19.0 | 4.1 | 0.3 | 159 | 165 | Do. |
| 9 | 88.9 | 0.5 | 10 | 0.1 | 5.80 | 7.0 | 11.0 | <0.2 | | | Do. |
| 10 | 88.4 | 0.75 | 10 | 0.1 | 4.38 | 4.0 | 19.0 | <0.2 | | | Do. |
| 11 | 87.9 | 1.0 | 10 | 0.1 | 4.35 | 4.8 | 16.0 | <0.2 | | | Edge detail poorer. |
| 12 | 87.4 | 1.25 | 10 | 0.1 | 3.62 | 1.4 | 55.0 | <0.2 | | | Do. |
| 13 | 86.9 | 1.5 | 10 | 0.1 | 3.19 | 1.0 | (No foaming) | | | | Do. |

[1] Resin equals 29.7%1 88,500 mol. wt. poly ortho-chlorostyrene plus 69.3% ortho-chlorostyrene plus 1.0% isopropyl percarbonate.
[2] DVB—the divinyl benzene was added as a 50:50 mixture with ethyl vinyl benzene (this value is for pure DVB).
[3] Ratio of the equilibrium swelling volume of the polymer in ortho-chloroethylbenzene to the initial solid volume at 25° C.
[4] Samples 1-8 were foamed 30 minutes in a 150° C. air oven, 9-12 were foamed for only 10 minutes before starting to collapse.
[5] Ratio of foam volume to initial solid volume.
[6] Celogen OT equals oxy-bis(benzene sulfonhydrazide) Naugatuck.

EXAMPLE 10

Two sheets of a copolymer of 10 weight percent butadiene rubber, 27 parts by weight acrylonitrile and 63 parts by weight of styrene having a thickness of 0.028 inch and 8 inches square are placed in generally face to face arrangement with a 0.125 inch thick silicone rubber gasket ½ inch in width around the perimeter are clamped together. A casting composition consisting of 63.56 weight percent orthochlorostyrene, 27.34 weight percent polyorthochlorostyrene, 8 weight percent fluorotrichloromethane, 0.1 weight percent diisopropyl peroxydicarbonate, and 0.1 weight percent of a divinylbenzene-ethylvinylbenzene mixture was placed in the space between the sheets of polymer and the assembly maintained at a temperature of 35° centigrade for a period of about 13 hours. At the end of this time the glass plates were removed, the polymer sheets were skins, and did not appear to have been deformed or attacked by the polymerization mixture which had become a rigid solid securely bonded to the face sheets to form a rigid sandwich. A 2 x 2 inch portion of the sandwich was heated for a period of 10 minutes in an air oven at a temperature of 150° centigrade. The product obtained measured about 4 x 4 inches and had doubled in thickness. The polymer skins had stretched with the foam and had reduced in thickness to about 0.007 inch. A similar sandwich was foamed under like conditions and the resultant expanded sandwich was plug formed into the form of a bowl. The resultant thermoformed expanded sandwich bowl exhibited excellent impact strength.

EXAMPLE 11

A mold was prepared having a cavity in the form of a generally rectangular plate, the inner surfaces of the mold were covered with a 1 mil thick polyvinyl fluoride film. The mold was used to prepare a plurality of sheets by filling with a polymerizable mixture containing a blowing agent, maintaining the mold at a temperature of about 86° Fahrenheit and exposing the mold to a source of high energy ionizing radiation from a cobalt-60 source to provide gamma radiation at a dose rate of $10^5$ rads per hour until the polymerizable mixture within the mold had been subjected to a total radiation dose of 1.6 megarads. Subsequently, the polymerized samples were removed from the mold and the results are set forth in Table V.

TABLE V

| | Composition | | | |
|---|---|---|---|---|
| | Methyl methacrylate (wt. percent) | Blowing agent | | Appearance after polymerization |
| No. | | Wt. percent | Type | |
| 1 | 90 | 10 | n-Pentane. | Hard opaque white resin. |
| 2 | 90 | 10 | Isopentane. | Do. |
| 3 | 90 | 10 | Cyclopentane. | Hard clear resin. |
| 4 | 90 | 10 | n-Hexane. | Hard opaque white resin. |
| 5 | 90 | 10 | Isohexane. | Do. |
| 6 | 90 | 10 | Neohexane. | Do. |
| 7 | 90 | 10 | CFCl$_3$. | Hard clear resin. |
| 8 | 90 | 10 | C$_2$F$_3$Cl$_3$. | Do. |

The polymerized sheets set forth in Table V were then heated in a hot air oven and the foam volume and time observed. The results are set forth in Table VI, wherein the sample numbers designate the samples prepared in Table V.

TABLE VI

| No. | Blowing agent | | Oven temp. (° C.) | $V_F/V_S$, after indicated heating time of— | | | |
|---|---|---|---|---|---|---|---|
| | Wt. percent | Type | | 5 min. | 15 min. | 30 min. | 60 min. |
| 1 | 10 | n-Pentane. | 130 | 1 | 6.7 | | 13 |
| 1 | 10 | do | 140 | 4 | 8 | 13.9 | 22 |
| 2 | 10 | Isopentane. | 130 | 1 | 3.6 | 5.6 | 14 |
| 2 | 10 | do | 140 | 3.6 | 7.6 | 15 | 18 |
| 4 | 10 | n-Hexane. | 130 | | 16.8 | 19.1 | 25.6 |
| 5 | 10 | Isohexane. | 130 | | 15.8 | 20 | 25.4 |
| 6 | 10 | Neohexane. | 130 | | 13.5 | 21 | 21.8 |
| 7 | 10 | CFCl$_3$. | 130 | | 1 | 1 | 1.5 |

All of the samples subjected to the hot air oven produced a fine celled foam having a very smooth surface and were enlarged replicas of the unfoamed sheet.

EXAMPLE 12

The procedure of Example 11 was repeated employing the monomer and blowing agents set forth in Table VII. All of the samples subjected to the hot air oven produced a fine celled foam having a very smooth surface and were enlarged replicas of the unfoamed sheet.

TABLE VII

| No. | MMA, percent | Blowing agent: CFCl$_3$, percent | Temp. (° C.) | $V_F V_s$, after indicated heating time of— | | | |
|---|---|---|---|---|---|---|---|
| | | | | 5 min. | 15 min. | 30 min. | 60 min. |
| 9 | 90 | 10 | 140 | 1 | 1 | 1 | 2 |
| 10 | 87.5 | 12.5 | 140 | 1 | 1 | 1.8 | 13.3 |
| 11 | 85 | 15 | 140 | 1 | 9 | 21 | 25 |
| 12 | 82.5 | 17.5 | 140 | 1 | 12.8 | 21 | 25.4 |
| 13 | 80 | 20 | 140 | 4 | 23.2 | 30 | 33.6 |
| 13 | 75 | 25 | 140 | 13 | 35.7 | 40.3 | 39 |

EXAMPLE 13

The polymerization procedure of Example 11 was repeated using the compositions set forth in Table VIII.

TABLE VIII

| No. | MMA, percent | Chlorostyrene, percent | CFCl$_3$, Percent | Appearance of cured resin |
|---|---|---|---|---|
| 14 | 85 | 0 | 15 | Clear hard resin (no bubbles). |
| 15 | 63.75 | 21.25 | 15 | Do. |
| 16 | 42.5 | 42.5 | 15 | Do. |
| 17 | 21.25 | 63.75 | 15 | Do. |
| 18 | 0 | 85 | 15 | Do. |

The sheets obtained from the polymerization of Table VIII were expanded in an air oven at a temperature of about 140° centigrade to produce fine celled expanded replicas of the unexpanded sheet. The cells varied in diameter from about 0.5 millimeter to about 1 millimeter. The resultant foams were white in appearance and did not shrink on cooling to room temperature. The results of the foaming are set forth in Table IX.

TABLE IX

| No. | Foaming temp., ° C. | $V_F/V_s$, foam volume after indicated heating time of— | | | |
|---|---|---|---|---|---|
| | | 5 min. | 15 min. | 30 min. | 60 min. |
| 14 | 140 | 1 | 9 | 21 | 25 |
| 15 | 140 | 2 | 12 | 22 | 27 |
| 16 | 140 | 3 | 16 | 26 | 33 |
| 17 | 140 | 3 | 24 | 31 | 38 |
| 18 | 140 | 4 | 35 | 42 | 49 |

The foamed sheet prepared in Table IX at 140° centigrade was sufficiently flexible and extensible to be formed by plug and vacuum forming methods into generally hemispheric structures which were rigid on cooling to about 25° centigrade.

EXAMPLE 14

A mixture comprising 85 parts by weight of dichlorostyrene (a mixture of 3,4- and 2,5-isomers) with 15 weight percent of trichlorofluoromethane was prepared. To this mixture, 0.1 weight percent of diisopropyl peroxydicarbonate was added. Portions of this mixture were cast into a cylindrical mold measuring 1½ inches in diameter and 0.375 inch in depth. The mixture was polymerized for 12 hours at 30° centigrade to a hard, transparent solid disc. The disc measuring about 1½ inches in diameter and 0.375 inch in thickness was heated at a temperature of 160° centigrade in an air oven for a period of about 1 hour. The disc expanded 16 volumes and was an expanded replica of the initial solid casting.

EXAMPLE 15

A 1:1 by weight mixture of monochlorostyrene and dichlorostyrene was prepared. To this mixture was added 15 weight percent of trichlorofluoromethane and 0.1 weight percent of diisopropylpercarbonate, weight percentages being based on the combined weight of the monochlorostyrene, dichlorostyrene, and trichlorofluoromethane. The resultant mixture was placed in 1½ inch diameter by 0.375 inch deep disc molds and polymerized for 24 hours at 30° centigrade. A hard, clear, solid resin disc was obtained. The resultant disc was heated for a period of one hour in an air oven at a temperature of 150° centigrade. The resultant foam was white, rigid, and had a uniform cell structure and expanded 22 volumes.

EXAMPLE 16

A plurality of samples are prepared employing a monomer mixture consisting of orthochlorostyrene and styrene containing 0, 5, 10, 15, 20, 25 and 30 weight percent styrene based on a combined weight of the orthochlorostyrene and styrene together with 13 weight percent based on the weight of the monomers of 1,1,2-trifluoro-2,2,1-trichloroethane together with ½ of 1 percent isopropyl percarbonate initiator.

A similar group of samples are prepared with the exception that 0.05 weight percent divinylbenzene is added. After polymerization of the samples, foaming is accomplished by heating it in a hot air oven at 140° centigrade. Desirable replication is obtained in all cases except the 25 and 30 weight percent styrene samples without divinylbenzene.

When the foregoing examples are repeated with the exception that any one or mixture thereof of the following blowing agents are used, commensurate results are obtained:

dibromodifluoromethane
1,2-dibromo-1,1,2,2-tetrafluoroethane
bromochlorofluoromethane
2,2-dichloro-1,1,1-trifluoroethane
dichloromethane
pentane
hexane
2,3-dimethylbutane
2,2-dimethylbutane
n-amylene and mixtures thereof which have boiling points under a pressure of one atmosphere between 9 and 60° centigrade to provide results substantially commensurate with those of the examples. If the oxy-bis(benzene sulfonyl hydrazide) of the foregoing examples is replaced with N,N' - dinitroso - N,N' - dimethyl terephthalamide, terephthalazide, azoisobutyric acid oxime, azodicarbonamide, α,α' - azobisisobutyronitrile when the examples employing diisopropyl peroxydicarbonate are repeated with the exception that the diisopropyl peroxydicarbonate is replaced with diisobutyleneozonide, commensurate results are obtained.

As is apparent from the foregoing specification, the method, composition and article of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method for the fabrication of a foamable generally isotropically expandable shaped article comprising providing a polymerizable mixture, the mixture comprising (a) an unsaturated substance selected from the group consisting of orthochlorostyrene, metachlorostyrene, parachlorostyrene, dichlorostyrene, methyl methacrylate, and mixtures thereof with up to 30 weight percent of styrene based on the weight of the polymerizable material and from about 0.035 weight percent to about one weight percent of a difunctional copolymerizable monomer, (b) a volatile organic liquid expanding agent present in the proportion of from about 3 to about 30 weight percent of the weight of (a), and from ½ to 20 weight percent of oxybis benzene sulfonyl hydrazide based on the weight of (b), at a temperature of from about 10° to about 35° C. under atmospheric pressure while restraining the polymerizable mixture in a desired predetermined configuration until at least the mixture is self-supporting.

2. The method of claim 1 including the step of heating the article to a temperature sufficient to cause it to expand to form a cellular product having generally the form of the unexpanded article.

3. The method of claim 1 including the step of removing restraint from the self-supporting mixture and heating the self-supporting mixture to cause it to expand and form a plurality of closed cells.

4. The method of claim 1 including the step of subjecting the unpolymerized mixture to high energy ionizing radiation.

5. The method of claim 1 including the step of incorporating in the polymerizable mixture a free radical generating catalyst.

6. The method of claim 1 including the step of dispersing within the polymerizable material a polymerized material.

7. The method of claim 1 wherein a major portion of the polymerizable mixture is a chlorostyrene.

8. The method of claim 1 including the step of polymerizing the mixture between a pair of opposed sheet members and subsequently expanding the polymerized material.

References Cited
UNITED STATES PATENTS

| | | | |
|---|---|---|---|
| 2,848,428 | 8/1958 | Rubens | 260—2.5 |
| 2,888,407 | 5/1959 | Cooper et al. | 260—2.5 |
| 2,941,964 | 6/1960 | Houston et al. | 260—2.5(B) |
| 2,947,675 | 8/1960 | Maisel et al. | 204—159.22 |
| 3,267,051 | 8/1966 | Landler et al. | 260—2.5 |

MURRAY TILLMAN, Primary Examiner

W. J. BRIGGS, SR., Assistant Examiner

U.S. Cl. X.R.

161—217, 253; 204—159.17, 159.22; 260—33.6, 33.8, 86.3, 87.5, 88.1, 89.5, 91.5, 880, 881, 886